United States Patent
Palmer et al.

(10) Patent No.: US 6,290,915 B1
(45) Date of Patent: Sep. 18, 2001

(54) APPARATUS HAVING MULTIPLE INPUTS FOR SOLID-PHASE CHEMICAL SYNTHESIS

(75) Inventors: Derek Adeyemi Palmer, Farnborough; Martin Thomas French, Leicestershire, both of (GB)

(73) Assignee: Kalibrant Limited (GB)

( * ) Notice: Subject to any disclaimer, the term of this patent is extended or adjusted under 35 U.S.C. 154(b) by 0 days.

(21) Appl. No.: 09/355,580

(22) PCT Filed: Dec. 15, 1998

(86) PCT No.: PCT/GB98/03761

§ 371 Date: Jul. 30, 1999

§ 102(e) Date: Jul. 30, 1999

(87) PCT Pub. No.: WO99/30817

PCT Pub. Date: Jun. 24, 1999

(30) Foreign Application Priority Data

Dec. 15, 1997 (GB) .................................... 9726482

(51) Int. Cl.[7] .................................................. B01J 19/00
(52) U.S. Cl. ........................ 422/129; 422/131; 422/134; 422/135; 422/138; 422/110
(58) Field of Search ..................... 422/134, 135, 422/138, 110, 111, 62, 129, 114, 116, 131; 435/286.5; 436/53, 52; 530/334

(56) References Cited

U.S. PATENT DOCUMENTS

| 4,746,490 | | 5/1988 | Saneii ...................................... 422/62 |
| 5,503,805 | * | 4/1996 | Sugarman et al. ................... 422/131 |
| 5,641,459 | | 6/1997 | Holmberg ............................. 422/134 |
| 5,649,576 | * | 7/1997 | Kirk et al. ............................ 141/129 |
| 5,807,525 | | 9/1998 | Allen et al. .......................... 422/131 |
| 5,861,125 | * | 1/1999 | Shively ................................. 422/101 |
| 6,126,904 | * | 10/2000 | Zuellig et al. ....................... 422/130 |

FOREIGN PATENT DOCUMENTS

| WO 85/01224 | 3/1985 | (WO) . |
| WO 97/06884 | 2/1997 | (WO) . |
| WO 97/07126 | 2/1997 | (WO) . |

* cited by examiner

Primary Examiner—Hien Tran
(74) Attorney, Agent, or Firm—Heslin Rothenberg Farley & Mesiti P.C.

(57) ABSTRACT

An apparatus and its use for chemical synthesis is disclosed. In one embodiment, the apparatus comprises a solid support input and a plurality of reagent inputs, wherein each input is connectable to a main fluid pathway via a respective switchable valve. The apparatus further comprises a reaction chamber that is fluidly connectable to the main fluid pathway by a respective switchable valve downstream of the inputs, and that includes an outlet downstream of a barrier that prevents passage of solid support but allows passage of unbound molecules.

8 Claims, 2 Drawing Sheets

APPARATUS HAVING MULTIPLE INPUTS FOR SOLID-PHASE CHEMICAL SYNTHESIS

PRIOR FOREIGN APPLICATIONS

This application is a 35 USC §371 filing of PCT/GB98/03761, filed Dec. 15, 1998, and claims priority from GB patent application number 9726482.4, filed Dec. 15, 1997.

1. Field of the Invention

The present invention relates to a method and apparatus for chemical synthesis. In particular, but not exclusively, the invention relates to a method of and apparatus for combinatorial chemistry for the synthesis of potential drug candidate molecules.

2. BACKGROUND OF THE INVENTION

The process of drug discovery has historically adopted the following development pathway. First, specific molecular targets f or drug intervention are defined through in-depth molecular and cellular studies. Once the target is defined, an assay system is developed to monitor biological or kinetic activity of potential drug molecules. Small libraries of chemicals are then synthesised and assayed to select those few that have apparent activity. The biological properties of those selected molecules are then studied on actual cells that are targeted for drug intervention. Those that seem to have favourable biological properties on natural cells then move on to chemical optimisation to improve their potency and selectivity. Their improved biological activity is reconfirmed and, those few that seem to be promising are then moved forward into pre-clinical animal studies to evaluate biological activity in vivo.

Combinatorial chemistry represents a novel approach for the synthesis of large collections of compounds for screening. This approach began in the laboratories of peptide chemists for the generation of peptide libraries. Due to the poor oral absorption and metabolic instability of peptides, non-peptide mimetic compounds (usually molecular weight of less than 500) have been developed. In combinatorial chemistry experiments, diverse chemical libraries can be produced by selecting sets of reactants, or building blocks, and reacting the sets with each other in all possible combinations thereby generating hundreds of thousands of individual small molecules. Libraries may consist of molecules free in solution, linked to solid particles or beads, or even arrayed on surfaces of modified microorganisms. Through the intelligent selection of building blocks, these libraries can be designed either as exploratory libraries, or as targeted libraries that are focused on certain structural hypotheses.

Combinatorial libraries are created in the laboratory by one of two methods, namely split synthesis or parallel synthesis.

In split synthesis, compounds are assembled on the surfaces of microparticles or beads. In each step, beads from previous steps are partitioned into several groups and a new building block is added. The different groups of beads are then recombined and separated once again to form new groups. The next building block is added, and the process continues until the desired combinatorial library has been assembled containing a random selection of molecules. Libraries resulting from split synthesis are characterised by the phrase "one bead, one compound." Each bead in the library holds multiple copies of a single library member.

Combinatorial libraries can also be made by parallel synthesis, in which different compounds are synthesised in separate vessels (without remixing), often in an automated fashion. Unlike split synthesis, which requires a solid support, parallel synthesis can be done either on a solid support or in solution.

Planning and performing combinatorial experiments in the laboratory is a complex and time-consuming process and thus automation is desirable. Instrumentation systems to help speed combinatorial chemistry experiments are believed to be in development at a number of biotechnology and pharmaceutical companies.

WO94/05394 suggests adoption of reusable spatially addressable solid phase plates on which all the synthesis reactions such as deprotection, cleaving and washing, can take place. U.S. Pat. No. 5,324,483, U.S. Pat. No. 5,593,642, U.S. Pat. No. 5,565,173, U.S. Pat. No. 5,582,801, U.S. Pat. No. 5,567,391 and WO94/08711 disclose the use of reservoir blocks having a plurality of wells for multiple simultaneous synthesis. WO93/12427 discloses the automation of the cleaving, deprotecting and purification processes for solid phase polypeptides. Most of the above processes have been semi-automated with robotic attachments which perform various steps required in synthesis reactions including reagent delivery, changing of reaction/collection vessels, incubation and agitation of reaction mixture, cleavage of synthesised compound from solid support in a range of environments e.g. under pressure or in a vacuum.

U.S. Pat. No. 5,503,805 and WO95/12608 disclose the development of a device for solid phase split and mix chemical synthesis in a closed system. The synthesis is carried out between a parent and daughter reaction vessels. The reagents are transported around the system by flow tubes and valves for example back and forth between the parent and daughter vessels.

The synthesis of organic compounds poses many problems in automated instrumentation including developing a device which will accommodate the wide range of manipulations required for organic synthesis. The synthesis of organic compounds often requires varied conditions such as heating, cooling, agitation, an inert atmosphere etc. Also such synthesis requires chemical compatibility between the materials used in the apparatus for synthesis and the solvents and reactants. Therefore the instruments must be constructed of materials which are resistant to organic synthesis conditions and procedures.

SUMMARY OF THE INVENTION

The present invention seeks to provide an apparatus for preparing chemicals in an efficient manner.

According to a first aspect of the present invention there is provided a chemical synthesis apparatus, comprising a plurality of reagent inputs, an input for solid supports and an input for solvents, each input being connectable to a main fluid pathway via a respective switchable valve, the apparatus further including a reaction chamber fluidly connectable to the main fluid pathway by a respective switchable valve downstream of the inputs and the reaction chamber further including an outlet downstream of a barrier arranged to prevent passage of the solid supports but allow passage of unbound molecules. The invention thus provides an apparatus which provides automated production of chemicals without the need for robotic arms for switching trays or the like, as all the manipulations take place in the fluid pathway. It is particularly advantageous for the flow through the reaction chamber to be one way as this allows much greater control of the reaction taking place within the chamber. Versatility is maintained by all of the inputs being connectable to the reaction chamber.

Preferably, the reaction chamber is one of a plurality of reaction chambers, where each reaction chamber is fluidly connectable to the main fluid pathway by a respective switchable valve downstream of the inputs and each reaction chamber further includes an outlet downstream of a barrier arranged to prevent passage of said solid supports but allow passage of unbound molecules. In this way more than one reaction may be undertaken at a time.

It is advantageous if the, some or each of the reaction chambers is removable form the apparatus. Thus physically different reaction chambers, for example with different volumes or internal coatings, can be used in the apparatus depending on the desired reaction.

It is also advantageous if the, some or each reaction chamber includes means for stirring or agitating the contents of the chamber and/or includes temperature control means arranged to control the temperature in the reaction chamber.

In a preferred embodiment of the invention, the output of the, some or each reaction chamber is connectable to detector means. The present invention allows combined synthesis and screening. All the known methods as described above can only be used to carry out synthesis. The device from U.S. Pat. No. 5,565,173 uses solid substrates to carry out the synthesis. The screening or analysis process is carried out separately following the removal of an aliquot of the synthesised compound from the reaction well. In the work disclosed in U.S. Pat. No. 5,324,633 arrays of polymers are also synthesised on a substrate. For the screening process the array of polymers is then exposed to a fluorescently labelled receptor. The fluorescence intensity of the labelled receptor is measured by photon counting using a separate instrument i.e. a confocal microscope. Binding affinities of the receptor for the synthesised polymers are determined through the analysis of the relationship between the fluorescence intensity and the solution concentration of the receptor. A similar procedure has also been described by U.S. Pat. No. 5,639,603, WO95/12608 and U.S. Pat. No. 5,5038,805 involving flow cytometry. The synthesis and screening procedures included numerous steps and separate devices. The devices just described and all the commercially available instruments do not have the combined synthesis/screening capability in the one device. These needs are met by the instrument of the present invention. There is a great benefit in terms of cost and time for having such a device for the screening process following the synthesis stage.

In the combined synthesis and screening apparatus there may be provided a screening agent input fluidly connectable to the respective switching valve for the, some or each of the reaction chambers. Thus the assay can take place in the reaction chamber after, of course, suitable washing cycles. In this case the screening agent input is preferably fluidly connectable to the respective switching valve via a secondary fluid pathway isolated from the main fluid pathway. This is because the synthesis reaction(s) will normally take place in an organic fluid environment, whereas the screening will normally take place in an aqueous environment.

In order to facilitate different assays a plurality of the screening agent inputs will normally be provided.

The output of the, some of each reaction chamber is advantageously selectively fluidly connectable to an output fluid pathway, the output fluid pathway including valve means to direct the output of the reaction chamber selectively to either a) waste or b) collection and/or analysis of the chemical compound. This simplifies the washing steps which will normally be required.

According to a second aspect of the present invention, there is provided a method of synthesising a chemical compound comprising the steps of:

a) transferring reagents from respective inputs into a reaction chamber via a main fluid pathway, wherein at least one reagent is affixed to a solid support and each of the inputs is separately connectable to the fluid pathway by a respective switchable valve;

b) maintaining the reactants in the reaction chamber to synthesise the chemical compound on the solid support;

c) releasing the chemical compound from the reaction chamber via an output downstream of all of the inputs. Controlled synthesis is thus efficiently and simply provided.

The reagents are advantageously selectively transferred to the reaction chamber. In this way the different reactants are only introduced into the chamber when required.

To increase capacity the reaction chamber may be one of a plurality of reaction chambers all selectively connectable to the main fluid pathway. Normally different compounds are synthesised in different reaction chambers at different times. Alternatively, the same compound is synthesised in more than one reaction chamber and in step b) the reactants are maintained under preselected different reaction conditions in each of the more than one reaction chambers. This allows a way of optimising reaction conditions for a particular reaction.

In most reactions an excess of at least one reactant is used in the synthesis. Advantageously, the method takes place in a closed fluid system which greatly simplifies the control of the reactants, solvents, washing stages, etc.

According to a third aspect of the present invention, there is provided a method of synthesising and screening a chemical compound in a closed fluid system, comprising the steps of:

a) synthesising the chemical compound from reactants in a reaction chamber on a solid support;

b) mixing the chemical compound with a screening agent in the reaction chamber;

c) directing a detectable moiety indicative of the chemical compound to a detector downstream of the reaction chamber.

According to a fourth aspect of the present invention, there is provided a method of synthesising and screening a chemical compound in a closed fluid system, comprising the steps of:

a) synthesising the chemical compound from reactants in a reaction chamber;

b) transferring the chemical compound in a fluid stream to a screening zone where the chemical compound is combined with a screening agent;

c) directing a detectable moiety indicative of the chemical compound to a detector downstream of screening zone.

Both the third and fourth aspects of the invention allow particularly efficient synthesis and screening of new compounds.

BRIEF DESCRIPTION OF THE DRAWINGS

A preferred embodiment of the invention will now be described with reference to the accompanying drawings in which.

DETAILED DESCRIPTION OF PREFERRED EMBODIMENTS

The illustrated and particularly preferred embodiment of the present invention provides a system which can be provided as a combined flow analysis/combinatorial chemistry/high-throughput screening (HTS) device. The individual reactions will be carried out on solid phase supports in sealed reaction vessels. Normally means will be provided for agitation of the vessel or stirring in the vessel to aid mixing. It is possible to vary the reaction conditions/ environments (such as temperature, pressure, agitation, etc.) in the different vessels to suit different reactions or to test different conditions for the same reactants.

It is thus possible to directly screen compounds synthesised combinatorially against the multiple targets with the same instrument thereby gaining information on the potential usefulness of the compounds.

Since the preferred embodiment is a synthesising and screening device there is a need to remove all traces of organic solvent (i.e. transfer to an aqueous phase) prior to the screening process of the synthesised compounds with the targets and receptors.

The device is made up of four main components:
1) Fluid delivery system;
2) Reaction chamber or cartridge;
3) Reagent compartments;
4) Proprietary fluorescence detection system.

Fluid delivery system

The pressurised fluid delivery system is a means of transporting reagent around the system. The fluid delivery system comprises individual components including:

a) flow analysis tubing made of materials such as PTFE or PEEK or any such organic solvent resistant material;

b) switching valves [3] having fluid-contact surfaces made of organic solvent resistant material, which valves divert the flow of solvents, reagents into the appropriate reaction vessels or receptacles;

c) flow sensors which monitor the flow rate within the system;

d) pressure sensors which monitor the pressure within the system.

The fluid delivery system comprises a fluid pathway into which the reactant, solvents etc. can be selectively input. Thereafter the input is delivered to a selected one or more reaction chamber.

Reaction chamber/cartridge

Figure 1:
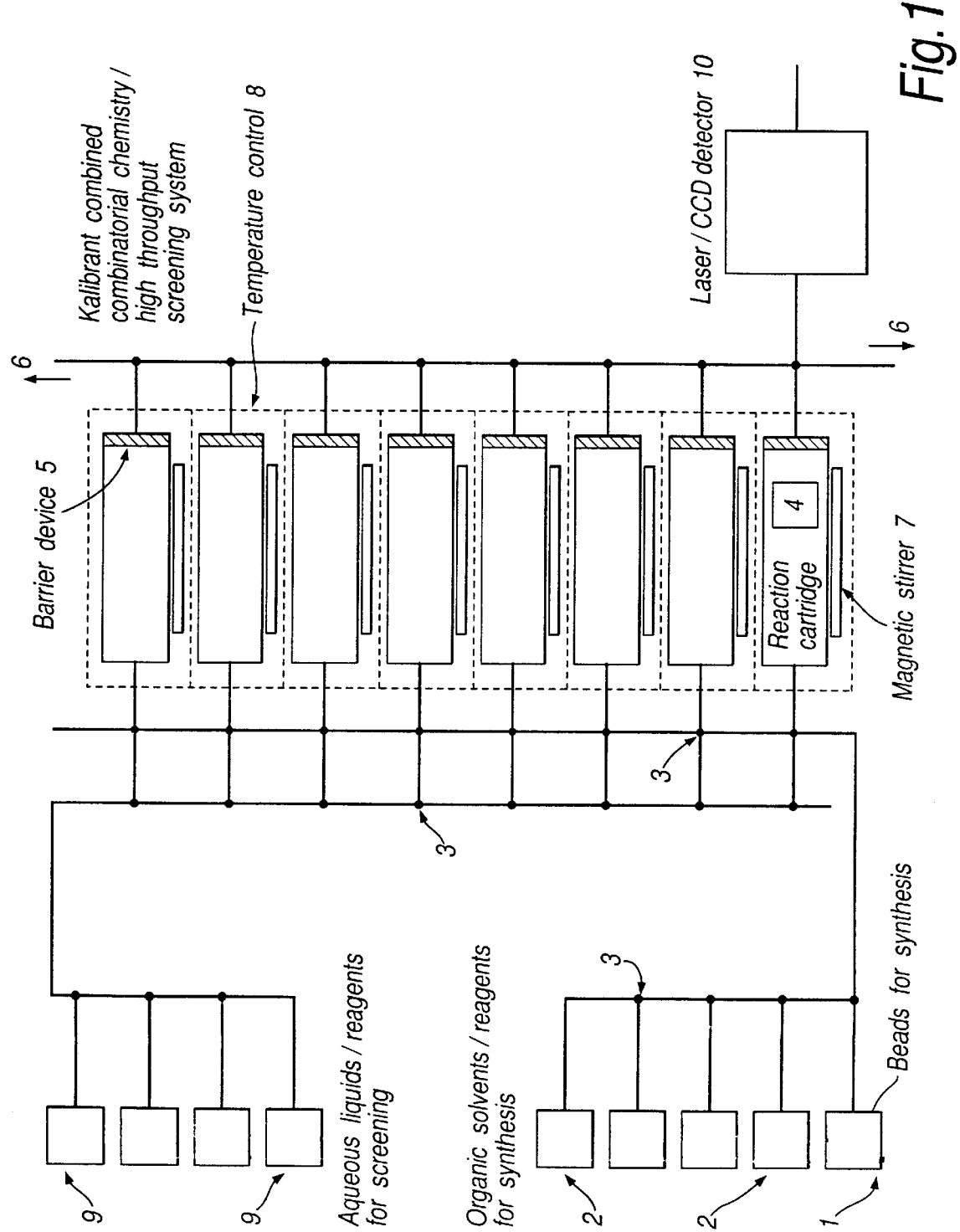
FIG. 1: shows a schematic representation of an apparatus according to the present invention.
Figure 2:
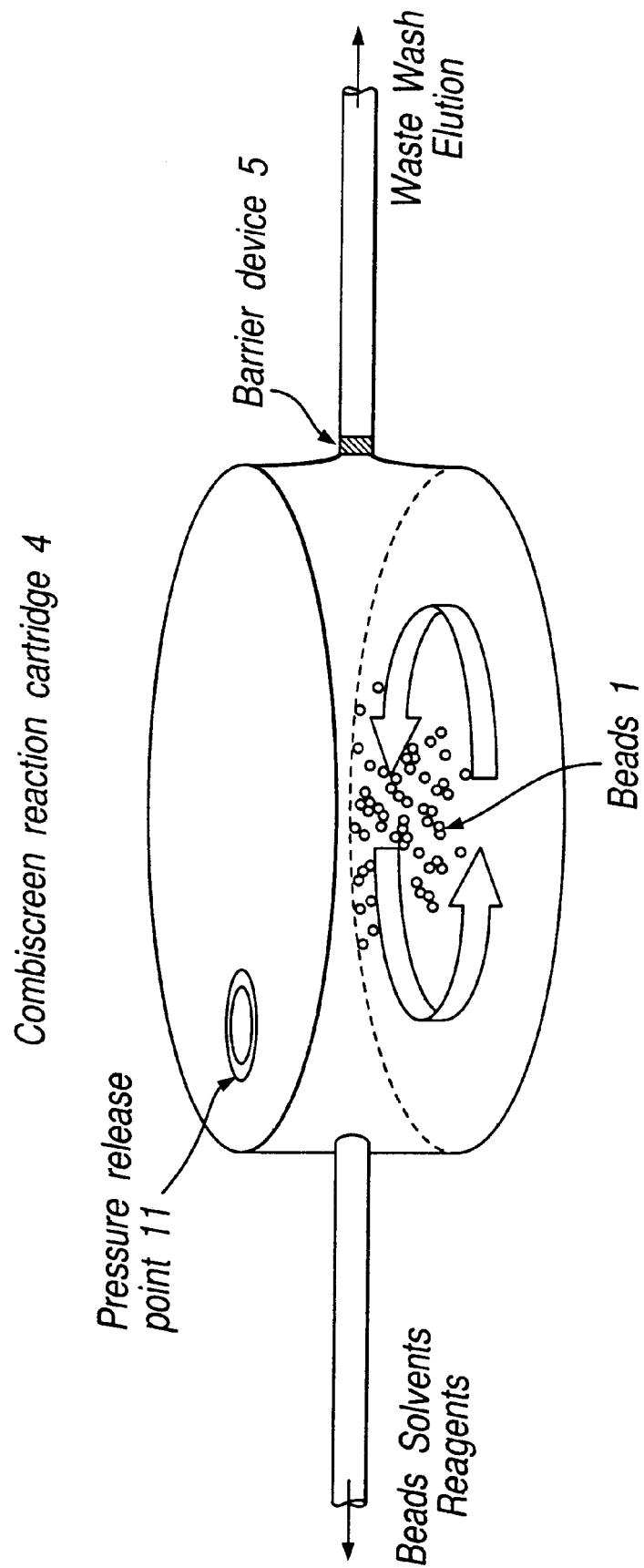
FIG. 2: shows a reaction chamber for use in the apparatus of FIG. 1.

The reaction chamber is the receptacle where the synthesis and screening takes place. The chamber would be made of chemically inert matter such as Teflon, polypropylene, glass etc. The reaction chamber will normally contain a magnetic flea for stirring of the reagents and will be housed in a sleeve which may include heating and/or cooling elements to effect heating and cooling e.g. from −40° C. to +150° C. as required. A preferred embodiment of a reaction chamber or cartridge [4] in the form of a removal chamber is shown in FIG. 2.

The reaction chamber will selectively receive reactants, solvents, etc. from the main fluid pathway via an inlet. The outlet port of the reaction chamber is separate from the inlet and contains a barrier (e.g. a membrane filter) to prevent the flow of the solid phase beads onto which the combinatorially synthesised compounds are attached when synthesised. The barrier will be formed of a chemically inert material.

Reactions that could be carried out in the chamber include carbon-carbon and carbon-heteratom bond formation reactions e.g. acylation of amines and alcohols, aldol and claisen condensations, cycloadditions, epoxidation, nucleophilic substitutions. Functional group interconversions include mitsunobu reactions, hydroborations, some oxidation reactions, preparations of imines and oximes and esterification/amidations of phosphates and carboxylates.

Reagent compartment

The reagent compartment will house the solid phase supports (e.g. beads) which will have the starter building blocks compound attached via a linker. The other building block components and receptor/target molecules used in the screening process will also be contained in normally separate areas of the reagent compartment. Each separate area of the housing can separately input the stored component into the fluid delivery system.

The solid phase supports and other building blocks will be suspended or dissolved in a solvent of appropriate density and surface tension. Solid phase supports that could be used in this system include controlled pore glass, silica, latex, polystyrene or similar polymer colloid metal particles.

The preferred and illustrated embodiment provides a combined combinatorial/high throughput screening system. This combined system may be used as an automated parallel combinatorial chemistry synthesiser with the final products released from the beads for storage or otherwise. The system offers a novel approach to lead compound generation with an emphasis on more targeted synthesis and immediate screening of the resulting products. This approach avoids the need to generate vast libraries of compounds which take an enormous length of time to screen and/or take up space waiting to be screened with the resulting concerns over storage stability. The present invention can allow for rapid turnaround of screening results which may lead to structure activity relationships being investigated in almost real time, with subsequent synthesis rounds being led by previous screening results. The ability to fully automate both the synthesis and the screening against multiple targets in a device that is small enough to operate on the bench top means that this approach provides a personal drug discovery platform.

A typical synthesis is described hereinafter where:

The flowlines for delivery of organic solvent are first primed from reagent reservoirs [2] and then a fixed quantity of reaction beads from input [1] are introduced into the flowline through the appropriate switching valve [3] and carried to a first reaction cartridge [4]. The beads are diverted into the reaction cartridge [4] by a first inlet switching valve [3] on the inlet to the cartridge [4] to the barrier device [5] at the outlet. Excess solvent passes through the barrier and is diverted to a waste via a switching valve [3] and output fluid pathway [6]. The first inlet switching valve [3] then diverts flow along the transmission tubing; the process is repeated with reaction beads added to each reaction cartridge as necessary via a respective inlet switching valve [3].

Synthesis in each reaction cartridge then proceeds independently with building blocks or wash steps added as appropriate from the reagent reservoirs [2] with stirring via stirring means [7] pressure via pressure release point [11] and temperature via temperature control means [8] as necessary. in the illustrated embodiment each individual reaction cartridge [4] has independent temperature control so that the system could also be used during the optimisation experiments, where each cartridge could be used to evaluate changes in solvent, temperature, time, etc.

Following synthesis the beads are washed and then, if required, the product can be cleaved using any of the standard methods and collected by washing out the reaction cartridge via the respective outlet switching valve [3] via the outlet fluid pathway [6]. Although the synthesised product may be directed to the waste point for collection, normally a separate outlet from outlet fluid pathway [6] is provided and the outlet switching valves [3] direct the synthesised product to the designated output.

Alternatively the product may be left on the bead in the cartridge for the on-board automated screening process and after screening detectable compound is output via output fluid pathway [6] to the detector [10].

A typical screening process is described hereinafter:

The flowlines for delivery of aqueous and biological reagents are first primed from the aqueous reservoirs [9], including flushing out the reaction cartridges where necessary. Reagents for the screening assay are transferred to the appropriate cartridges [4] and the synthesised product incubated with the assay reagents. The product can be used on the bead or cleaved prior to incubation when immobilised reagents are used and the target is conjugated to a solid support such as a bead.

Regardless of approach, the screening assay contains a reporter molecule (e.g. a fluorophore) which at the end of the assay is released through the cartridge and diverted to the laser/CCD detector system [10] via the output fluid pathway [6]. Often the assay will be a fluorescence assay and the amount of fluorescence measured will be related to the degree of inhibition or interference that the product has on the assay.

Details of the detector and assay systems may be found in the Applicants copending applications namely WO 97/29376, International Application No. PCT/GB98/02394 and International Application No. PCT/GB98/02396, the disclosures of which are herein incorporated by reference. Please note that the reaction cartridge [4] of the present invention may replace the incubation loops with the barrier [5] on the outlet replacing the of the Applicants previous applications. Alternatively, the synthesised compound may be broken of the bead in the reaction cartridge [4] and transferred to a detector and assayed therein via the outlet fluid pathway [6].

The use of the Applicants multi-analyte detector system means that several screens can be run simultaneously in the same cartridge [4], against the same product.

A separate fluorescent reporter is used for each screen so that a single synthesised product can be examined against a number of different targets at the same time with specific inhibition/interference simultaneously monitored for each target.

What is claimed is:

1. An apparatus for the synthesis and screening of chemical compounds, said apparatus comprising:

a main fluid pathway including a plurality of reagent inputs, connected to a source of reagents and organic liquids for introducing reagents and organic liquids into the apparatus, and a solid support input, connected to a source of solid supports for introducing solid supports into the apparatus, each input being fluidly connectable to the main fluid pathway via a respective switchable input valve;

a reaction chamber fluidly connectable to the main fluid pathway via a switchable reaction chamber valve downstream of the switchable input valves, the reaction chamber including an outlet downstream of a barrier arranged to prevent passage of said solid supports but allow passage of unbound molecules out of the reaction chamber; and a second fluid pathway, isolated from the main fluid pathway and including a screening agent input, connected to a source of screening agents for introducing screening agents in an aqueous medium into the apparatus, said second fluid pathway fluidly connectable to the reaction chamber via the switchable reaction chamber valve, said main fluid pathway for transporting said reagents and organic liquids and said solid supports to the reaction chamber for synthesis of chemical compounds in an organic medium, and said second fluid pathway for transporting said screening agents in an aqueous medium to said reaction chamber for screening of the synthesized chemical compounds.

2. The apparatus according to claim 1, further comprising at least one additional reaction chambers, fluidly connectable to the main fluid pathway via a respective switchable chamber valve downstream of the input valves, the at least one additional reaction chamber having an outlet downstream of a barrier arranged to prevent passage of said solid supports but allow passage of unbound molecules out of the reaction chamber.

3. The apparatus according to claim 1, wherein the reaction chamber is removable from the apparatus.

4. The apparatus according to claim 1, wherein the reaction chamber includes means for stirring or agitating products introduced into the chamber.

5. The apparatus according to claim 1, wherein the reaction chamber includes temperature control means arranged to control the temperature within the reaction chamber.

6. The apparatus according to claim 1, wherein the outlet of the reaction chamber is connectable to detector means.

7. The apparatus according to claim 1, wherein said second fluid pathway includes at least one additional screening agent inputs.

8. The apparatus according to claim 1, wherein the outlet of the reaction chamber is selectively fluidly connectable to an output fluid pathway, the output fluid pathway including valve means to selectively direct an output of the reaction chamber to a waste passageway, a collection passageway, an analysis passageway or a combination thereof.

* * * * *